United States Patent [19]

Nocek et al.

[11] Patent Number: 4,615,891

[45] Date of Patent: Oct. 7, 1986

[54] METHOD OF FORMULATING DAIRY COW RATIONS BASED ON CARBOHYDRATE REGULATION

[75] Inventors: James E. Nocek, Lafayette; Darwin G. Braund, Fayetteville; Robert L. Steele, Syracuse; Charles A. Macgregor, Lafayette, all of N.Y.

[73] Assignee: Agway Inc., Dewitt, N.Y.

[21] Appl. No.: 772,011

[22] Filed: Sep. 3, 1985

Related U.S. Application Data

[63] Continuation-in-part of Ser. No. 694,105, Jan. 23, 1985, abandoned.

[51] Int. Cl.$^4$ .............................................. A01K 43/00
[52] U.S. Cl. .................................... 426/231; 426/623; 426/636; 426/807
[58] Field of Search .................. 426/231, 2, 623, 630, 426/636, 807

[56] References Cited

U.S. PATENT DOCUMENTS

| | | | |
|---|---|---|---|
| 4,086,365 | 4/1978 | Snetsinger et al. | 426/807 X |
| 4,118,513 | 10/1978 | Braund et al. | 426/2 |
| 4,186,213 | 1/1980 | Burroughs et al. | 426/807 X |
| 4,377,596 | 3/1983 | Larsen | 426/807 X |

FOREIGN PATENT DOCUMENTS 2924753  1/1981  Fed. Rep. of Germany ...... 426/231

OTHER PUBLICATIONS

Morrison, "Feeds & Feeding", The Morrison Publishing Co. (1957) pp. 10–16, 649–652 & 1083–1085.

*Primary Examiner*—R. B. Penland
*Attorney, Agent, or Firm*—Charles S. McGuire

[57] ABSTRACT

A novel method of formulating dairy cow rations based on regulation of the content of non-structural carbohydrates and neutral detergent fiber in the total daily ration, including both forage and grain portions, is disclosed. Feedstuffs analyzed to determine the percentages of non-structural carbohydrate and neutral detergent fiber contained thereby were fed in various proportions to test groups of cows under controlled conditions, and to commercial herds under actual field conditions to determine the effects, if any, on milk production by varying the proportion of the total daily ration constituted by non-structural carbohydrates. Also, the proportion of non-structural carbohydrates to neutral detergent fiber in the ration was calculated and compared with milk production levels. It was established that milk production was optimized when the total daily ration, including at least one grain and one forage, consists of between about 30% and 45% non-structural carbohydrates, depending upon forage type. Furthermore, it was found that the ratio of non-structural carbohydrates to neutral detergent fiber bears a quadratic relation to milk yield and that the optimal response is achieved by maintaining the ratio within a range of about 0.9 to 1.2, the preferred ratio being about 1.05 (i.e., 1 part non-structural carbohydrate to 1.05 parts neutral detergent fiber).

11 Claims, 1 Drawing Figure

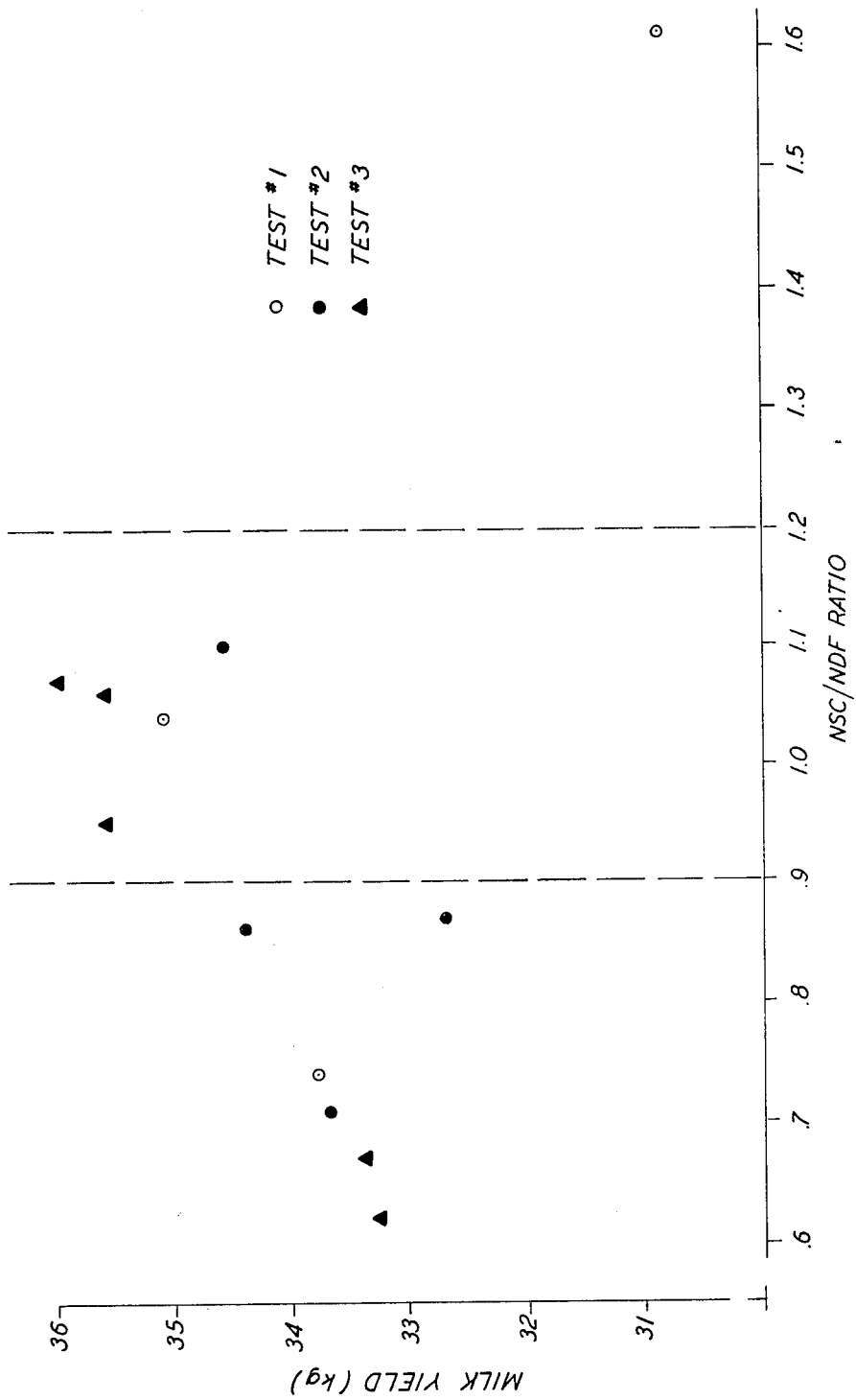

METHOD OF FORMULATING DAIRY COW RATIONS BASED ON CARBOHYDRATE REGULATION

REFERENCE TO RELATED APPLICATIONS

This is a continuation-in-part of application Ser. No. 694,105, filed Jan. 23, 1985, now abandoned, and is related to the divisional application thereof, Ser. No. 773,054, filed Sept. 6, 1985.

BACKGROUND OF THE INVENTION

The present invention relates to methods of formulating dairy cow rations to optimized milk yield, and more particularly to such methods which are based upon regulation of the non-structural carbohydrate content of the total ration and the ratio thereof to the neutral detergent fiber content.

U.S. Pat. No. 4,118,513, assigned to applicants' assignee, describes a method of formulating dairy rations based on adjustment of the proportions of soluble and insoluble protein in the total dietary protein to obtain a positive response in milk production. The present invention is the result of research directed toward determining the optimum balance of structural and non-structural carbohydrates in dairy cow rations for increased milk production and feed efficiency.

It is well known, of course, that carbohydrates are the principal energy source for many animals, as well as humans. Plant carbohydrates may be categorized in two major groups, namely, structural and non-structural. The structural carbohydrates, found in the cell wall, are essentially rigid in nature, providing strength to the cell walls and thus to the plant itself. The fibrous materials which make up the cell walls, i.e., the structural carbohydrates, also known as neutral detergent fiber, are mainly cellulose, hemicellulose, and ligin. Non-structural carbohydrates, found mainly within the lumen of the cell, inlude sugars and starch. Although pectins (D-methyl-galacturonic acid) are a soluble component of the cell wall, they are almost completely digestible (98%) in the rumen. In addition, they are precipitated out of the cell wall by ethylene diamine tetra acetic acid (EDTA) which is contained in neutral detergent solution. A significant amount of pectin substances are contained in leguminous feedstuffs fed to animals (e.g. alfalfa, soybean meal, beet pulp, etc.) These pectin substances may physically be associated with the cell wall, but chemically they are associated with and behave like cell solubles; therefore, they are also considered a part of the non-structural carbohydrates.

The major source of structural carbohydrates in dairy cattle rations is forage. The quality and degree of structural carbohydrate availability (digestability) to rumen microorganisms in different forages are quite variable, being influenced by such factors as plant variety, maturity at harvest and storage conditions. Grains generally have more non-structural carbohydrates and are generally less variable in carbohydrate content than forage.

It has been generally accepted that structural carbohydrate is a negative indicator of ration energy concentration. That is, the more structural carbohydrate a given ration contains, the less energy value it provides, and vice versa. Present energy-based feeding systems for ruminants are based on this relationship.

In order to develop a feeding system which includes regulation of carbohydrates in the total daily ration, it is necessary, of course, to have available an accurate and repeatable method of quantitating both structural and non-structural carbohydrates in each constituent of the ration. A procedure which has been found to be superior to those previously in general use is disclosed in the aforementioned parent and divisional applications and is the method used for determining the non-structural carbohydrate content of feedstuffs in the practise of the present invention.

In the most general sense, the object of the present invention is to provide methods of formulating dairy cow rations which have a positive influence on milk production without an off-setting increase in the cost of the feeding program.

A further object is to provide a method of formulating dairy cow rations based upon regulation of the ratio of non-structural carbohydrates to neutral detergent fiber in the total daily ration, including both forage and grain portions.

Another object is to provide methods of balancing carbohydrate and protein types in dairy cow feeding programs which maximize efficiency of microorganism growth and yield, fiber digestion and overall feed efficiency, and milk production.

Other objects will in part by obvious and will in part appear hereinafter.

SUMMARY OF THE INVENTION

In accordance with the foregoing objects, the invention establishes a method of formulating dairy cow rations which includes the analysis of a plurality of plant materials, including both forage and grains, to determine the proportion of each which is constituted by non-structural carbohydrates and by neutral detergent fiber. A total daily ration is then formulated, including a forage which preferably constitutes between about 40% and 50% of the total ration, on a dry matter basis, and a grain or supplement portion with all ingredients balanced so that the total ration contains between about 30% and 45% of non-structural carbohydrates. Also, the total daily ration is preferably formulated to establish the ratio between non-structural carbohydrates and neutral detergent fiber at between about 0.90 and 1.2, the most preferable ratio being about 1.05.

Experiments were conducted to test the value of regulating the type and amount of carbohydrates in dairy cow feeding programs which had previously been based upon regulating protein in accordance with previously mentioned Pat. No. 4,118,513. Results of the initial research were analyzed to develop conclusions and recommendations which were implemented in field studies, conducted on a total of 13 commercial dairy herds under actual operating conditions. Results of the field studies supported the findings of the controlled research results.

BRIEF DESCRIPTION OF THE DRAWING

The single drawing FIGURE is a graph showing the relationship of the ratio of non-structural carbohydrates to neutral detergent fiber in the total ration to milk yield.

DETAILED DESCRIPTION

The non-structural carbohydrate and neutral detergent fiber content of a number of different forages and grains were determined using the method of the aforementioned parent application, now the subject matter of related application Ser. No. 773,054. The following table shows the ingredient tested, the number of samples analyzed (N), the mean values of non-structural carbohydrates (NSC) on a dry matter basis, and the standard deviation of the mean (SD):

TABLE I

| Ingredient | N | NSC Mean SD (% Dry Matter Basis) |
|---|---|---|
| Corn silage | 3 | 36.3 ± 5.4 |
| Hay crop silage | 3 | 27.6 ± 4.8 |
| Soybean meal | 4 | 29.5 ± 1.0 |
| Distillers grains | 3 | 21.8 ± 3.5 |
| Dried brewers grains | 4 | 13.2 ± 1.8 |
| Corn gluten feed | 3 | 34.1 ± 3.5 |
| Corn gluten meal | 3 | 25.5 ± 7.4 |
| Hominy | 3 | 57.6 ± .9 |
| Whole corn | 3 | 75.1 ± 2.8 |
| Wheat middlings | 3 | 34.0 ± 3.9 |
| Soybean hulls | 3 | 20.8 ± 2.3 |
| Beet pulp | 4 | 39.5 ± 2.9 |
| Canola meal | 4 | 28.0 ± 2.9 |
| Barley | 3 | 64.8 ± .9 |

Based on the forgeoing values, three experimental grain mixes were formulated to contain relatively low, medium and high levels of non-structural carbohydrates. The percentages of each ingredient used in the three grain mixes is as follows:

TABLE II

| Ingredients | Low-NSC | Med-NSC | High-NSC |
|---|---|---|---|
| | | (As Fed Basis) | |
| Brewers grains | 23.5 | 18.9 | 8.6 |
| Soybean meal | 2.0 | 2.0 | 8.9 |
| Hominy | 45.0 | 49.4 | 4.0 |
| Corn meal | 2.6 | 4.0 | 65.7 |
| Soybean hulls | 20.4 | 10.3 | — |
| Wheat middlings | 2.0 | 7.5 | 7.6 |
| Corn gluten feed | 2.0 | 5.2 | 2.0 |
| Salt | 1.0 | 1.0 | 1.0 |
| Dicalcium phosphate | .35 | .5 | .9 |
| Ground limestone | .8 | 1.1 | 1.2 |
| Dynamate | .1 | .1 | .1 |
| Dairy TRA-MIN-MX | .05 | .05 | .05 |
| VITA ADE-3X | .017 | .017 | .017 |

The non-structural carbohydrate portions of the composite mixes given above are, low NSC 39.8%, medium NSC 51.2% and high NSC 64.6%, on a dry matter basis.

A trial was conducted in the dairy herd at the Agway Cooperative Research Farm in Tully, N.Y. under controlled conditions. Forty-five multiparous, early lactation cows were balanced according to previous lactation 305-day mature equivalent production and parity, assigned to three groups of 15 cows each and fed three respective total mixed ration treatments starting one day postpartum. The total daily ration consisted of 40% forage (dry matter basis) which included 22.5% non-structural carbohydrates, and 60% of the respective grain mix. This resulted in the non-structural carbohydrate (NSC) content of the total daily ration of the three groups being: low NSC 32.9%, medium NSC 39.7% and high NSC 47.8%.

All rations were isocaloric ($NE_1$), isonitrogenous and the soluble protein levels were similar between treatments. The total ration contained a minimum of 18% crude protein. Individual feed consumption and milk production were recorded daily.

The forage portion of the ration consisted of hay crop silage, samples of which were collected weekly and composited monthly. Samples of the grain mixes were taken at the mill, at the time each new batch of feed was mixed. All samples were analyzed for percent dry matter, crude protein, soluble protein, acid detergent fiber, neutral detergent fiber, acid detergent bound nitrogen, non-structural carbohydrate, calcium and phosphorus.

Starting with day 6 and 7 postpartum and throughout the trial period, milk samples were collected weekly during four consecutive milkings the same 2 days of each week, composited and analyzed for percent fat and protein. Individual body weights were taken on two consecutive days immediately priior to trial initiation and again upon termination at 10 weeks.

Results were tabulated as follows:

TABLE III

| Variable | Low-NSC | Med-NSC | Hi-NSC |
|---|---|---|---|
| Cows/trt | 15 | 15 | 15 |
| Dry matter intake (kg/cow/d) | 18.7 + .7 | 19.5 + .7 | 18.8 + .7 |
| Milk yield (kg/cow/d) | 33.8 + 4.5 | 35.1 + 4.3 | 30.9 + 3.4 |
| Week of peak | 5 | 8 | 5 |
| Fat (%) | 3.61 + .6 | 3.49 + .5 | 3.67 + .4 |
| Fat yield (kg/cow/d) | 1.19 + .05 | 1.19 + .05 | 1.12 + .04 |
| Protein (%) | 3.02 + .2 | 2.99 + .2 | 3.11 + .2 |
| Protein yield (kg/cow/d) | 1.01 + .1 | 1.04 + .1 | .95 + .1 |
| 4% FCM | 31.4 + 2.1 | 31.9 + 2.0 | 29.1 + 1.9 |
| Body wt (kg) | | | |
| Initial | 596 | 605 | 581 |
| 10 wk | 583 | 592 | 564 |
| Change | −13 | −13 | −17 |

The difference in milk yield between the groups on the medium NSC and high NSC rations was statistically significant at a probability of less than 0.01, i.e., the probability was at least 99% that the higher yield was due to the difference in non-structural carbohydrate levels and not to chance. The higher milk yield for the group on the low NSC ration versus that on the high NSC was statistically significant at a probability of less than 0.10 (greater than 90%), and the 4% FCM (fat corrected milk) differences were statistically significant at a probability of less than 0.05.

As previously mentioned, the only forage used in the foregoing trial was hay crop silage, which contains higher levels of soluble protein and lower levels of non-structural carbohydrates than forages such as corn silage. Therefore, total rations could be formulated with a wider variation in the percentage of non-structural carbohydrates by adjustment of the individual ingredients in the grain portion of the ration. Thus, when hay crop silage or hay comprises the sole forage source, it may be concluded, based upon the results of carefully controlled tests, that a positive response in milk yield is achieved by regulating the total daily ration to contain medium (39.7%) levels of non-structural carbohydrates, as compared to higher (47.8%) levels. The optimum response was obtained at the medium level and, moreover, the group receiving the lower non-structural carbohydrate levels experienced a greater incidence of health-related problems. Therefore, when feeding hay or hay crop silage as forage, it has been demonstrated that regulating the total daily ration to contain in the neighborhood of 40% (e.g., within a range of 30% to 45%) non-structural carbohydrates provides optimum milk yield and feed efficiency with no deleterious side effects.

Recognizing that most forage rations do not consist entirely of hay or hay crop silage, additional testing was conducted to determine if regulating the total ration non-structural carbohydrate content is beneficial in other forage programs. A second trial was conducted under controlled conditions to evaluate the effect of regulating the non-structural carbohydrate content of dairy rations wherein corn silage was the only forage. Since corn silage contains higher levels of non-structural carbohydrates than hay or hay crop silage, the percentage of non-structural carbohydrates in the total ration cannot be varied as widely by adjusting the composition of the grain mix in feeding programs based on corn silage. As a practical matter, dairy rations consisting of 50% corn silage and 50% grain mix, balanced to provide all necessary nutritional factors, may be varied by only about 15 percentage units in the amount of non-structural carbohydrate content.

In the test conducted to determine the effect of non-structural carbohydrate content of total daily ration on milk yield, 45 cows, in their second lactation or beyond, were equally balanced into two test groups and a control group. All cows were fed a total mixed ration consisting of 50% corn silage and 50% treatment grain mix, on a dry matter basis, free choice, over a 15 week period. As in the previously described test, all rations had the same amount of crude protein, soluble protein, energy, vitamins and minerals. The only difference between rations was the amount of non-structural carbohydrates, which were balanced to levels of approximately 30% to 40% for the two test groups. The control group was fed a commercial grain mix with regulated protein solubility which had previously been in use for a number of years. Although no account had been taken of the non-structural carbohydrate content when formulating the standard (control) grain mix, analysis showed that the total daily ration consisting of 50% of this mix and 50% corn silage contained 35.5% non-structural carbohydrates.

The compositions of the control and the two test grain mixes, by percentage of individual ingredients, were as follows:

TABLE IV

| | Grain Mix Treatments | | |
|---|---|---|---|
| | Control 35.5%-NSC (A) | 30.0%-NSC (B) | 40.0%-NSC (C) |
| Ingredient | (As Fed Basis) | | |
| Corn meal | 20.1 | — | 36.45 |
| Brewers grains | 17.0 | 17.0 | 13.0 |
| Distillers grains | 9.0 | 15.0 | 7.75 |
| Gluten feed | — | 8.6 | — |
| Hominy feed | — | 8.75 | — |
| Wheat midds | 20.5 | — | 9.35 |
| Soybean meal | 23.0 | 21.0 | 26.7 |
| Soybean hulls | — | 25.7 | 2.0 |
| Molasses | 5.0 | — | — |
| Pellet binder | 1.25 | — | — |
| Salt | 1.0 | 1.0 | 1.0 |
| Dicalcium phosphate | .25 | — | .40 |
| Ground limestone | 2.80 | 2.65 | 3.0 |
| Dynamate | .25 | .25 | .25 |
| Dairy TRA-MIN | .05 | .05 | .05 |
| VITA-MX ADE | .034 | .034 | .034 |

Results of the test are tabulated in the following table:

TABLE V

| | Treatments | | |
|---|---|---|---|
| Variables | Control 35.5%-NSC (A) | 30.0%-NSC (B) | 40.0%-NSC (C) |
| Cows/trt | 15 | 15 | 15 |
| Dry matter intake | 19.2 + .7 | 20.4 + .8 | 19.3 + .7 |
| Milk yield, kg/day | 32.7 + 1.3 | 33.7 + 1.3 | 34.6 + 1.2 |
| Actual fat, % | 3.55 + .14 | 3.48 + .10 | 3.28 + .10 |
| Covariantly adjusted fat, % | (3.33 + .11) | (3.57 + .05) | (3.42 + .08) |
| Fat yield, kg/day | 1.15 + .05 | 1.17 + .04 | 1.13 + .04 |
| Protein, % | 3.18 + .06 | 3.13 + .05 | 3.13 + .05 |
| Protein yield, kg/day | 1.04 + .03 | 1.05 + .04 | 1.08 + .03 |
| 4% fat-corrected milk, kg/day | 30.3 + 1.1 | 31.0 + 1.0 | 30.8 + 1.0 |
| Efficiency | | | |
| kg milk/kgDM | 1.70 + .09 | 1.65 + .08 | 1.79 + .07 |
| kg 4% FCM/kgDM | 1.60 + .07 | 1.54 + .07 | 1.62 + .07 |
| Avg. gross milk income ($/cow/day) | 8.71 | 8.88 | 8.87 |
| Body weight | | | |
| Initial, kg | 598 + 20 | 605 + 15 | 582 + 15 |
| Final, kg | 632 + 22 | 637 + 15 | 614 + 11 |
| Change, kg | 35 + 8 | 32 + 10 | 32 + 7 |

Milk yield was significantly higher in cows receiving the test ration containing 40% non-structural carbohydrate, as compared to the control group, the difference being 1.9 kg/cow/day, or 5.8% more milk, the average daily production being over 34.5 kg per cow. The higher level of milk yield was statistically significant at a probability of less than 0.10, using accepted statistical procedures. That is, since non-structural carbohydrate content was the only formulated variable, the probability was at least 90% that the higher milk yield was due to the difference in non-structural carbohydrate content in the rations and not to chance. Milk yield from the group receiving the 30% non-structural carbohydrate test ration fell between those on the 40% and control (35.5%) rations and cannot be found to be different from either in a statistically significant sense.

The test also demonstrated that cows fed total rations with the optimum (40%) non-structural carbohydrate level peaked higher and consistently maintained a higher milk production level over the experimental period. Efficiency of milk production was 5.3% higher for cows fed the optimum non-structrual carbohydrate level. There was no significant difference in average daily feed intake between groups.

A third trial was conducted under controlled conditions to evaluate the effect of regulating the non-structural carbohydrate content of dairy rations wherein the forage portion consists of a combination of corn silage and hay crop silage. In addition, a further objective was to evaluate the effect of utilizing different amounts and/or types of grain mix ingredients to formulate rations of the same NSC level.

Ninety-five early lactation cows in their second lactation or beyond were equally balanced into 5 test groups in their fourth week postpartum. All cows were fed a total mixed ration, free choice, consisting of 25% corn silage, 25% alfalfa hay crop silage and 50% treatment grain mix, on a dry matter basis, over a 10 week period. All rations had the same amount of crude protein, energy, vitamins and minerals. The only differences in the rations was the amount of non-structural carbohydrates, which were balanced to levels of approximately 30% and 40% of the total dry matter. Within the 30% NSC rations, two grain mixes were formulated to the same NSC level utilizing different concentrations of the same ingredients. Within the 40% NSC rations, three grain mixes were formulated to the same NSC level, utilizing different types and amounts of grain ingredients.

The compositions of the two grain mixes used for the 30% NSC rations (30%-A, 30%-B) and the three grain mixes used for the 40% NSC rations (40%-A, 40%-B and 40%-C), by percentage of individual ingredients, were as follows:

TABLE VI

| | Grain Mix treatments | | | | |
|---|---|---|---|---|---|
| Ingredient | 30%-NSC (A) | 30%-NSC (B) | 40%-NSC (A) % | 40% NSC (B) | 40% NSC (C) |
| Corn meal | — | — | 44.3 | 36.7 | — |
| Brewers grains | 17.0 | 17.0 | 17.0 | 8.9 | 17.0 |
| Dried distillers grains | 18.6 | 4.2 | — | — | 3.1 |
| Hominy feed | 12.5 | 6.1 | — | — | — |
| Wheat midds | 21.2 | 39.4 | 20.3 | 32.1 | 13.0 |
| Soybean meal | — | — | 5.3 | 13.4 | — |
| Soybean hulls | 23.1 | 23.6 | 2.0 | — | — |
| Gluten meal | 1.8 | 4.0 | 5.0 | 5.0 | 2.0 |
| Ground barley | — | — | — | — | 48.6 |
| Canola meal | — | — | — | — | 10.3 |
| Molasses | 3.0 | 3.0 | 3.0 | 3.0 | 3.0 |
| Salt | 1.0 | 1.0 | 1.0 | 1.0 | 1.0 |
| Ground limestone | 1.6 | 1.6 | 1.7 | 1.8 | 1.7 |
| Dairy TRA-MIN | .05 | .05 | .05 | .05 | .05 |
| Dynamate | — | — | .19 | — | — |
| VITA-MX ADE | .017 | .017 | .017 | .017 | .017 |

Samples of grain mix treatments and forages were collected and chemically analyzed as described in previous experiments. Individual feed consumption and milk production were recorded daily. Milk samples were collected weekly during the same four consecutive days of each week and analyzed for percent fat and protein. Individual body weights were taken on two consecutive days at trial initiation and again upon termination at 14 weeks into lactation.

The results of the experiment are listed in the following table:

TABLE VII

| | Treatments | | | | |
|---|---|---|---|---|---|
| Variable | 30%-NSC (A) | 30%-NSC (B) | 40%-NSC (A) | 40%-NSC (B) | 40%-NSC (C) |
| Cow/trt | 19 | 19 | 19 | 19 | 19 |
| Dry matter intake, kg | 19.4 ± .2 | 19.4 ± .2 | 20.2 ± .2 | 20.5 ± .5 | 19.4 ± .2 |
| Dry matter intake, % of bwt. | 3.35 | 3.28 | 3.28 | 3.35 | 3.15 |
| Milk yield, kg/day | 33.4 ± .4 | 33.3 ± .3 | 35.6 ± .4 | 36.0 ± .3 | 35.6 ± .4 |
| Milk fat, % | 3.47 ± .03 | 3.52 ± .04 | 3.46 ± .04 | 3.33 ± .03 | 3.30 ± .05 |
| Milk fat yield kg/day | 1.16 ± .02 | 1.17 ± .01 | 1.23 ± .02 | 1.20 ± .02 | 1.16 ± .02 |
| Milk protein, % | 2.95 ± .01 | 2.97 ± .01 | 3.01 ± .01 | 3.01 ± .01 | 3.07 ± .01 |
| Milk protein, kg/day | .98 ± .01 | .99 ± .01 | 1.07 ± .01 | 1.08 ± .01 | 1.09 ± .01 |
| 4% fat corrected milk, kg/day | 30.8 ± .4 | 30.8 ± .3 | 32.7 ± .4 | 32.4 ± .4 | 31.7 ± .4 |
| Efficiency | | | | | |
| Kg milk/kg DM | 1.79 ± .02 | 1.78 ± .02 | 1.78 ± .02 | 1.78 ± .02 | 1.86 ± .02 |
| Kg 4% FCM/kg DM | 1.65 ± .02 | 1.64 ± .02 | 1.63 ± .02 | 1.61 ± .02 | 1.64 ± .02 |
| Body weight | | | | | |
| Initial, kg | 580 ± 11 | 591 ± 14 | 615 ± 18 | 615 ± 15 | 613 ± 13 |
| Final, kg | 582 ± 11 | 587 ± 14 | 614 ± 17 | 622 ± 15 | 612 ± 11 |
| Change, kg | 2 ± 5 | −4 ± 4 | −1 ± 4 . 7 ± 5 | −1 ± 6 | |

There were no statistically significant differences for any varibles between or among treatments within the 30% or 40% NSC levels. Therefore, subsequent discussion is limited to compairsons between 30% vs 40% NSC level (30%-A+30%-B vs 40%-A+40%-b+40%-dC). Dry matter intake was not significantly different between non-structural carbohydrate (NSC) levels when considered as average daily intake, or as a percentage of body weight. Milk yield was significantly higher in cows receiving the test ration containing 40% NSC, as compared to the 30% NSC rations, the average difference being 2.4 kg/cow/day, or 7.1% more milk, the average daily production being over 35.7 kg per cow. The higher level of milk yield was statistically significant at a probability of less than 0.03. The experimental results also demonstrated that cows fed the optimum (40%) NSC level peaked higher in milk production and were more persistant in milk production over the experimental period, as was demonstrated with this non-structural carbohydrate level (40%) in the two previous trials.

Thus, in each of the three trials previously described, a total ration non-structural carbohydrate level of approximately 40% gave significant positive responses in milk production. In each trial an economic advantage in gross milk income was realized at the 40% non-structural carbohydrate level. Although this level has been demonstrated to be effective with different forages, and with forage combinations the range of values is wider for forges containing lower percentages of non-structural carbohydrates (e.g., hay and hay crop silage) than for those containing higher percentages (e.g., corn silage). That is, while the total daily ration in a feeding program wherein the forage is hay or hay crop silage may range from 35% to 45% in non-structural carbohydrate content, the level in a corn silage based ration should be kept between about 38% and 42%.

In addition to the three previously described controlled tests, a field study was conducted to determine milk production responses when commercial dairy herds, under normal operating conditions, were changed from their normal grain rations to a regulated non-structural carbohydrate grain mix and balanced with the forage portion of the ration. The test included 13 dairy herds using predominantly hay crop silage in a forage program in effect for at least two weeks before introduction of the regulated carbohydrate feeding program. Milk production was considered only from cows that were fed the rations regulated for non-structural carbohydrate content for a full 30-day period. A sample of each feedstuff used in the respective herds was obtained and analyzed for percent crude protein, soluble protein, non-structural carbohydrate, acid detergent fiber, neutral detergent fiber, calcium, phosphorus and dry matter. Non-structural carbohydrate and soluble protein of the total ration was calculated for each herd.

Again, the results of the field study confirm that, in the majority of commercial herds, milk production is improved by a feeding program based upon regulated non-structural carbohydrates.

Based upon the percentages of neutral detergent fiber in the total daily rations fed in the course of the foregoing controlled tests (designated respectively at Tests Nos. 1, 2 and 3) the ratio between non-structural carbohydrates and neutral detergent fiber was established and compared with milk yield. Results are given in the following table:

TABLE VIII

| Total Ration, DM basis | 1 | 2 | 3 | 4 | 5 |
|---|---|---|---|---|---|
| Test No. 1 (week 1 thru 10 of lactation) | | | | | |
| NSC, (%) | 32.9 | 39.7 | 47.8 | | |
| NDF, (%) | 44.5 | 38.1 | 29.7 | | |
| NSC/NDF | .74 | 1.04 | 1.61 | | |
| Milk (Kg/d) | 33.8 | 35.1 | 30.9 | | |
| Test No. 2 (week 5 thru 19 of lactation) | | | | | |
| NSC, (%) | 36.3 | 32.1 | 40.5 | 36.2 | |
| NDF, (%) | 41.9 | 45.3 | 37.6 | 42.1 | |
| NSC/NDF | .87 | .71 | 1.1 | .86 | |
| Milk (Kg/d) | 32.7 | 33.7 | 34.6 | 34.4 | |
| Test No. 3 (week 5 thru 14 of lactation) | | | | | |
| NSC, (%) | 30.6 | 29.2 | 39.2 | 38.8 | 37.7 |
| NDF, (%) | 45.6 | 46.9 | 36.2 | 38.8 | 39.7 |
| NSC/NDF | .67 | .62 | 1.06 | 1.07 | .95 |
| Milk (Kg/d) | 33.4 | 33.3 | 35.6 | 36.0 | 35.6 |

Each of the values shown in Table VIII for the NSC/NDF ratio are plotted on the X-axis of the graph of the accompanying drawing, versus the corresponding milk yield values in the Y-axis. As seen in the graph, significantly higher milk yields were obtained when the NSC/NDF ratio was between about 0.9 and 1.2, with the optimal milk yields occurring at a ratio of about 1.05. A statistical analysis of all data points for the three tests shows a regression coefficient of 0.86 at a highly significant level ($P < 0.001$) for a quadratic relationship between NSC/NDF ratio and milk yield, while the probability of significance using a linear relationship is not significant. This demonstrates a very high degree of confidence in the fact that the NSC/NDF ratio and milk yield have a quadratic relationship, and that the optimal response is in the 0.9 to 1.20 range.

What is claimed is:

1. The method of formulating dairy cow rations for optimized milk production comprising:
   (a) determining the percentage, on a dry matter basis, of non-structural carbohydrates of each of a plurality of components, including at least one grain and one forage, collectively comprising a total daily ration and according to the following method:
      (i) weighing first and second, essentially chemically identical samples of said feedstuff;
      (ii) determining the dry matter content of said first and second samples;
      (iii) determining by chemical analysis the respective percentages of said first sample dry matter constituted by crude protein, lipid and ash;
      (iv) separating said second sample into first and second parts, respectively comprising the parts which are soluble and insoluble in neutral detergent solution;
      (v) weighing said second part to determine the percentage of said second sample dry matter constituted thereby;
      (vi) determining by chemical analysis the respective percentages of said second part of said second sample constituted by crude protein, lipid and ash;
      (vii) subtracting from the percentages of crude protein, lipid and ash determined for said first sample, each of the respective quantities of crude protein, lipid and ash determined for said second part of said second sample, to obtain three difference figures; and
      (viii) subtracting the sum of said three difference figures from said percentage of dry matter constituted by said second part of said second sample, and subtracting the result from 100, thereby providing a figure representing the percentage of said dry matter constituted by non-structural carbohydrates; and
   (b) adjusting the proportion and composition of at least one of said components to a level wherein the portion of said total daily ration consisting of non-structural carbohydrates is between about 30% and 45%.

2. The method of claim 1 wherein said forage comprises between about 40% and 50% of said total daily ration, on a dry matter basis.

3. The method of claim 1 wherein said forage is corn silage and said percentage of non-structural carbohydrates is about 40%.

4. The method of claim 1 wherein said forage is hay or hay crop silage.

5. The method of claim 1 wherein said forage is a combination of corn silage and hay or hay crop silage.

6. The method of claim 1 and further including determining the percentage, on a dry matter basis, of total protein, and the rumen soluble and insoluble proportions thereof, of each of said components, and adjusting the proportion of at least one of said components to provide a total daily ration meeting the total protein required and wherein at least 15% but not more than 25% of said total protein is rumen soluble.

7. The method of claim 6 wherein said forage comprises between about 40% and 50% of said total daily ration, on a dry matter basis.

8. The method of claim 6 wherein said forage is corn silage and said percentage of non-structural carbohydrates is about 40%.

9. The method of claim 6 wherein said forage is hay or hay crop silage.

10. The method of claim 1 and further including the steps of:
   (a) determining the percentage, on a dry matter basis, of neutral detergent fiber of each of said plurality of components; and
   (b) adjusting the proportion and composition of at least one of said components to a level wherein the ratio of non-structural carbohydrates to neutral detergent fiber in said total daily ration, on a dry matter basis, is between about 0.9 and 1.20.

11. The method according to claim 10 wherein said ratio is established at about 1.05.

* * * * *